Figures 1, 2:
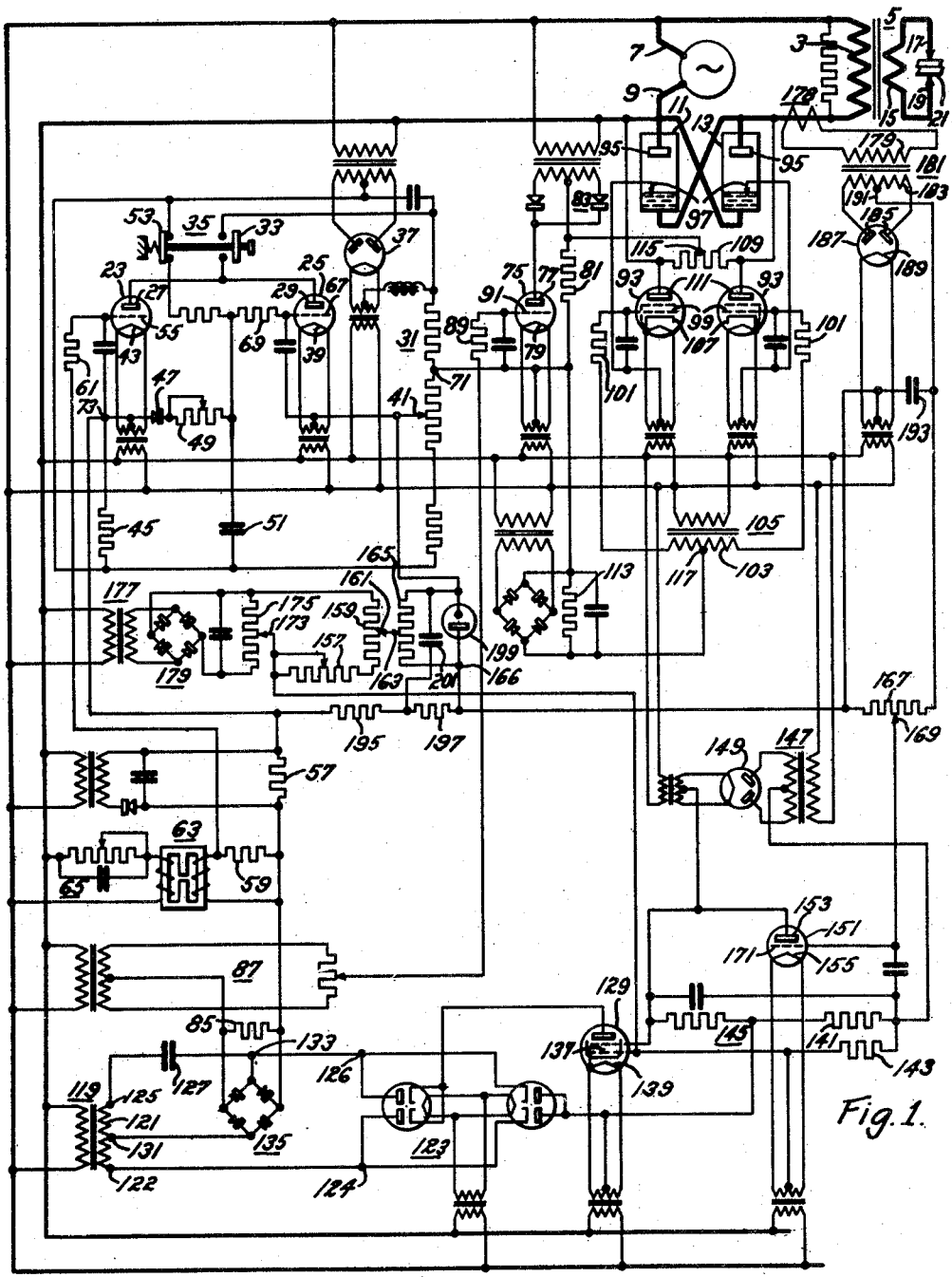

Nov. 18, 1947.   E. C. HARTWIG   2,431,248
CONSTANT CURRENT SYSTEM
Filed Dec. 5, 1944

WITNESSES:
Wm. B. Sellers.
John R. Shipman

INVENTOR
Edward C. Hartwig.
BY
F. W. Lyle
ATTORNEY

Patented Nov. 18, 1947

2,431,248

UNITED STATES PATENT OFFICE 2,431,248

CONSTANT CURRENT SYSTEM

Edward C. Hartwig, Pittsburgh, Pa., assignor to Westinghouse Electric Corporation, East Pittsburgh, Pa., a corporation of Pennsylvania Application December 5, 1944, Serial No. 566,721

4 Claims. (Cl. 171—119)

This invention relates to a control system for resistance welding apparatus and has particular relation to a system for controlling the welding current and the time of flow thereof.

Resistance welding apparatus constructed in accordance with the teachings of the prior art, often includes a pair of inversely connected electric discharge valves of the arc-like type, such as ignitrons, interposed between an alternating voltage source and the primary winding of the welding transformer to control the flow of welding current. An electronic control system is provided to render the ignitrons conductive alternatively in successive half periods of the source voltage throughout a timed period. The control system includes an adjustment whereby the instant in a half period at which an ignitron is rendered conductive may be determined. Thus, both the welding time and the welding current are controlled.

It is well known that in many applications the magnitude of the welding current must be accurately controlled to effect a good weld. Consequently, in making a series of welds with a given material, the current during each weld must be maintained substantially constant if the time of current flow for each weld is the same.

One of the chief causes of current variation is the variation in source voltage which sometimes occurs. Obviously, if the source voltage drops and the ignitrons continue to be rendered conductive at the same instant in a half period, the welding current is decreased accordingly.

Another cause of variation in the welding current is found in the nature of the welding operations themselves. A series of welds are often to be made on the same piece of ferrous material. In positioning the material for successive welds, the amount of the material extending within the loop formed by the circuit from the secondary winding of the welding transformer through the welding electrodes, is varied in an irregular manner. It has been found that a change in the amount of ferrous material within the loop may result in a considerable change in the impedance of the load of the welding transformer. With a change in the load impedance the welding current is also changed.

The changes in the welding current resulting from either or both the variation in source voltage and the variation in impedance of the load occur rapidly and do not follow any determinable course. Consequently, it is impractical for the operator to adjust the magnitude of the welding current manually for each weld. It is accordingly an object of my invention to provide a system for controlling the supply of current to a load which is automatically adjustable to maintain the R. M. S. value of the load current substantially constant.

Another object of my invention is to provide a control system in which compensation is provided for the effect of variations in source voltage upon the load current.

A further object of my invention is to provide a control system in which compensation is provided for the effect of variations in the impedance of the load upon the load current.

A still further object of my invention is to provide a control system in which compensation is provided for the effect upon the load current of variations in both the source voltage and the impedance of the load.

The features of my invention which I consider novel are set forth with particularly in the appended claims. The invention itself, however, with respect to the organization and operation, together with further objects and advantages thereof, may best be understood from the following description of specific embodiments when read in connection with the accompanying drawing, in which:

Figure 1 illustrates my invention as embodied in an electronic control system for a resistance spot welding apparatus, and Fig. 2 illustrates a modification which may be applied in connection with the system of Fig. 1.

As shown in Fig. 1, the primary winding 3 of a welding transformer 5 is connected across a pair of alternating voltage supply lines 7 and 9 through a pair of inversely connected electric valves of the arc-like type 11 and 13, such as ignitrons. The secondary winding 15 of the welding transformer 5 is connected in circuit with a pair of welding electrodes 17 and 19 and the material 21 to be welded which is engaged therebetween.

A control system is provided for the ignitrons 11 and 13 which is of a type which has been manufactured for several years by the Westinghouse Electric & Manufacturing Company. The system includes a pair of electric valves 23 and 25, preferably thyratrons, which are hereinafter designated as a start tube and a stop tube. The anodes 27 and 29 of these tubes are connected together and to the positive terminal of a direct current voltage divider 31 through an originally open contact 33 of a push button starting switch 35. The voltage divider 31 is energized from the alternating voltage supply lines 7 and 9 through a full-wave rectifier 37.

The cathode 39 of the stop tube 25 is connected to an intermediate point 41 on the voltage divider 31. The cathode 43 of the start tube 23 is connected to the negative terminal of the divider 31 through parallel paths, comprising a resistor 45 in one path and a rectifier 47, a timing potentiometer 49 and a timing capacitor 51 in the other path. The timing capacitor 51 is originally maintained in a discharged state by a discharge circuit completed thereacross through an originally closed contact 53 of the push button switch 35.

The control circuit of the start tube 23 extends from the cathode 43 to the grid 55 thereof through a resistor 57 across which a direct current biasing voltage exists, another resistor 59 across which a voltage impulse is impressed at intervals, and a grid resistor 61. The voltage impulse across the resistor 59 is supplied through a peaking transformer 63 and a phase shifting circuit 65 energized from the supply lines. The phase shifting circuit 65 is adjusted so that an impulse of a polarity and magnitude to overcome the biasing voltage, occurs at an instant in a positive half period of the alternating source voltage at which the alternating current passes through zero in accordance with the power factor of the load. When the push button switch 35 is operated, the discharge circuit of the timing capacitor 51 is opened, and the start tube 23 is rendered conductive in the next positive half period of the alternating voltage by the voltage impulse across the resistor 59.

The control circuit of the stop tube 25 extends from the cathode 39 to the grid 67 thereof through the intermediate tap 41 and the negative terminal of the divider 31, the timing capacitor 51 and the grid resistor 69. The voltage impressed in this control circuit by the divider 31 tends to maintain the stop tube non-conductive. However, when the start tube becomes conductive, the timing capacitor 51 is charged at a rate determined by the setting of the potentiometer 49, and the voltage across that capacitor opposes the biasing voltage supplied from the divider 31. Consequently, a predetermined time interval after the start tube becomes conductive, the stop tube is rendered conductive.

It is then apparent that another intermediate point 71 on the divider 31 is originally positive with respect to a point 73 at the cathode of the start tube. When the start tube becomes conductive, the point 71 becomes negative with respect to point 73; but upon the stop tube becoming conductive, point 71 again becomes more positive than point 73. The voltage appearing between points 71 and 73 is employed as a biasing voltage in the control circuit of another tube 75, preferably a thyratron, which is designated as the heat control tube.

The anode 77 and cathode 79 of the heat control tube 75 are connected in circuit with another resistor 81 and an auxiliary source 83 of rectified, alternating potential in phase with the supply voltage. The control circuit of the heat control tube 75 extends from the cathode 79 through points 71 and 73, the resistor 57, another resistor 85, a balancing potentiometer circuit 87 and a grid resistor 89 to the grid 91 of the tube. As previously indicated, a biasing voltage is supplied across points 71 and 73, and another much smaller biasing potential is supplied across the resistor 57. A voltage exists across the other resistor 85 which takes the form of a phase-shifted, rectified alternating voltage which is inverted with respect to the grid 91 of the heat control tube 75, and displaced in phase relative to the supply voltage.

Before the start tube 23 is rendered conductive, the biasing voltage between points 71 and 73 is sufficient to prevent the heat control tube 75 from becoming conductive. When the start tube 23 becomes conductive and so long as it is conductive, the voltage existing between points 71 and 73 is such that the voltage peaks, in the resultant voltage impressed between the grid 91 and cathode 79 of the heat control tube 75, corresponding to the peaks in the voltage component across resistor 85, rise above the critical grid-cathode voltage of the heat control tube to render it conductive. Thus, the heat control tube 75 becomes conductive in each half period of the alternating supply voltage throughout a period of time determined by the setting of the timing potentiometer 49, and at an instant in each half period determined by the amount of phase shift in the voltage appearing across the resistor 85. As will be explained hereinafter, the ignitrons, 11 and 13, are rendered conductive alternately in successive half-periods of the supply voltage at an instant corresponding to the instant at which the heat control tube 75 becomes conductive.

The balancing potentiometer circuit 87 is normally adjusted so that it does not effect the control of the heat control tube 75. However, if the starting characteristics of the two ignitrons 11 and 13 differ, one may become conductive at an instant in a half period later than the instant at which the other ignitron becomes conductive in its corresponding half period, even though the heat control tube 75 becomes conductive at the same instant in each half period. Under such circumstances, the balancing potentiometer circuit 87 is adjusted to impress a small alternating voltage in the control circuit of the heat control tube 75 of such a nature as to render the tube conductive at a slightly different instant in alternate half periods. It follows that the adjustment results in the ignitrons becoming conductive at substantially the same instant in each half period.

A firing tube 93, preferably a thyratron, is provided for each of the ignitrons 11 and 13 and is connected between the anode 95 and igniter 97 thereof. Consequently, when a firing tube 93 becomes conductive current flows through the igniter 97 of the corresponding ignitron to render that ignitron conductive.

The control grids 99 of the firing tubes 93 are connected together through their grid resistors 101 and the secondary winding 103 of an auxiliary transformer 105. The cathodes 107 of the firing tubes 93 are also connected together through the igniters 97 of the ignitrons and a resistor 109 between the anodes 111 of the firing tubes. A control voltage, consisting of a biasing voltage appearing across another resistor 113 and the control voltage appearing across the resistor 81 in the anode circuit of the heat control tube 75, is impressed between a center tap 115 on the resistor 109 interconnecting the cathodes of the firing tubes and the center tap 117 of the secondary winding 103 interconnecting the grids.

Since the cathodes 107 of the firing tubes are interconnected, an alternating voltage appears across the resistor 109. To balance out this alternating voltage an equal alternating voltage displaced in phase by 180° is supplied across the secondary winding 103 of the auxiliary transformer 105. Then, when the heat control tube 75 becomes conductive, the voltage across the resistor 81 in the anode circuit thereof causes the firing tube whose anode is positive at the time, to become conductive to render the corresponding ignitron conductive.

In prior apparatus, the phase shifting circuit for supplying a voltage across the resistor 85 in the control circuit of the heat control tube is manually adjustable to preselect the instant in a half period at which the heat control tube, and, consequently, the ignitrons, become conductive and thereby determine the magnitude of the welding current. In accordance with my invention, a phase shifting circuit is provided which is not only adjustable manually to preselect the magnitude of the welding current but is also adjustable automatically to maintain the current substantially constant in spite of variations in supply voltage and load impedance.

The phase shifting circuit is energized from the alternating current supply lines through another auxiliary transformer 119. One terminal 122 of the secondary winding 121 of the auxiliary transformer is connected to an alternating current terminal 124 of a full-wave rectifier unit 123. The other alternating current terminal 126 of the unit 123 is connected to the other terminal 125° of the secondary winding 121 through a capacitor 127. The direct current terminals of the rectifier unit 123 are connected across a high vacuum electric valve 129. This high vacuum valve 129 is arranged to act as an impedance element in the phase shifting circuit. In cooperation with the capacitor 127 it effects a shifting of the phase of the alternating voltage which appears between the center tap 131 of the secondary winding 121 and a point 133 intermediate the capacitor 127 and the rectifier unit 123, with respect to the alternating voltage across the end terminals 122 and 125 of the secondary winding 121. The amount of phase shift is, of course, dependent upon the impedance offered by the high vacuum valve 129. The phase shifted alternating voltage is then impressed in the input circuit of a full-wave rectifier 135, the output circuit of which is connected across the resistor 85.

The impedance offered by the high vacuum valve 129 is controlled by the voltage impressed between the control grid 137 and cathode 139 thereof. This voltage is that which appears across a pair of resistors 141 and 143 connected between the cathode 139 and the control grid 137. A biasing voltage tending to maintain the control grid 137 highly negative with respect to the cathode 139 appears across the resistor 141 which is a part of a direct current voltage divider 145 energized from the supply lines 7 and 9 through an auxiliary transformer 147 and a full-wave rectifier 149. An opposing variable voltage appears across the other resistor 143 of a magnitude dependent upon the current flowing through an amplifier tube 151. Thus, the amount of current passing through the amplifier tube 151 determines the impedance of the vacuum tube 129 and so determines the instant in a half-period at which the heat control tube becomes conductive.

The anode 153 and cathode 155 of the amplifier tube 151 are connected in series with the resistor 143 across the end terminals of the voltage divider 145. The control circuit of the amplifier tube 151 extends from the cathode 155 through an adjustable resistor 157, a portion of a first potentiometer 159 to the adjustable tap 161 thereon, an adjustable tap 163 on a second potentiometer 165 and from an end terminal 166 thereof through a portion of a third potentiometer 167 to the adjustable tap 169 thereon, and thence to the grid 171 of the tube.

The first potentiometer 159 and the adjustable resistor 157 are connected between an end terminal and the adjustable tap 173 on a fourth potentiometer 175. This fourth potentiometer 175 has a direct current voltage existing thereacross which is supplied from the alternating voltage supply lines through an auxiliary transformer 177 and a full-wave rectifier 179. The tap 173 on the fourth potentiometer 175 is adjusted so that the sum of the voltages across the first potentiometer 159 and the adjustable resistor 157 is equal to the voltage required in the control circuit of the amplifier tube 151 to result in the heat control tube becoming conductive at an instant very late in a half-period, such as approximately 135° after the start of a half period. The adjustable resistor 157 is to be set so that the voltage drop thereacross is equal to that required to result in the heat control tube becoming conductive very early in a half-period, such as an instant just after the alternating current passes through zero in accordance with the power factor of the circuit. The adjustable tap 161 of the first potentiometer 159 is then adjusted manually so that the voltage impressed in the control circuit of the amplifier tube by the adjustable resistor 157 and the first potentiometer 159 is such as to cause the heat control tube to become conductive at a selected point between an instant very early in a half-period determined by the setting of the adjustable resistor 157 and an instant very late in a half-period as determined by the setting of the adjustable tap 173 on the fourth potentiometer 175.

A current transformer 178 is connected in series with the primary winding 3 of the welding transformer 5 and the output thereof is supplied to the primary winding 179 of a step-up transformer 181. The secondary winding 183 of the step-up transformer 181 has its end terminals connected to the anodes 185 of a full wave rectifier tube 187, the cathode 189 of which is connected through the third potentiometer 167 to the center tap 191 of the secondary winding 183. A capacitor 193 is connected in parallel with the third potentiometer 167. The dimensions of the capacitor 193 and third potentiometer 167 are selected so that the direct current voltage appearing across the potentiometer 167 is substantially proportional to the R. M. S. value of the current through the primary winding of the welding transformer. It is important that the R. M. S. value of the current be used since the form factor of the wave shape of the current changes with different instants of ignition of the ignitrons.

The second potentiometer 165 has a direct current voltage impressed thereacross throughout the period timed by the start tube-stop tube circuit. This voltage is obtained from the point 73 at the cathode of the start tube 23 and the tap 41 on the divider 31. The point 73 which is positive while the start tube 23 is conductive, is connected through a pair of resistors 195 and 197 and the second potentiometer 165 to the tap 41. A voltage regulator tube 199, such as a glow tube, is connected across the second potentiometer 165. A capacitor 201 is connected in parallel with the second potentiometer 165 and the resistor 197. The adjustable tap 163 on the second potentiometer 165 is mechanically connected with the adjustable tap 157 on the first potentiometer 159 so that the voltage impressed in the control circuit of the amplifier tube 151 from the second potentiometer 165 is adjusted in accordance with the preselection of the current through the primary winding 3 by the first potentiometer 159.

The polarity of the voltage across the second potentiometer 165 is opposite to that of the voltage across the third potentiometer 167. The magnitudes of the voltages impressed in the control circuit of the amplifier tube 151 by the second and third potentiometers are adjusted so that when the desired current is flowing in primary winding 3, the two voltages balance out. When the two voltages balance out, the instant at which the heat control tube, and therefore, the ignitrons become conductive is determined by the setting of the first potentiometer 159. However, should the current vary for some reason from the preselected value, the voltage of the third potentiometer 167 changes accordingly. The polarity of the voltage impressed in the control circuit of the amplifier tube 151 by the third potentiometer is such that the instant at which the ignitrons become conductive is varied to compensate for the variations in the current through the primary winding and so to maintain that current substantially constant.

It is to be noted that in obtaining the voltage across the third potentiometer 167 substantially proportional to the R. M. S. value of the current, the relative dimensions of the capacitor 193 and potentiometer 167 are such that the voltage on the potentiometer 167 cannot rise instantaneously to a value proportional to the R. M. S. value of the welding current at the beginning of a welding period. Instead it rises gradually at the very beginning of the welding period. Such a condition could easily give rise to highly undesirable transients. To avoid such transients, I have provided the arrangement whereby the voltage of the third potentiometer 167 is balanced against the standard voltage of the second potentiometer 165, and the standard voltage is arranged by use of the capacitor 201 and its dimensions with respect to the dimensions of the second potentiometer 165, to increase approximately at the same rate. Consequently, the voltages impressed in the control circuit of the amplifier tube 151 by the second and third potentiometers are substantially balanced throughout the welding period if the correct current is flowing.

It is obvious that since the system actually regulates the flow of current in the primary winding 3, it does not matter whether the change of current is caused by a change in impedance of the load or by a variation in supply voltage. However, in some applications of resistance welding apparatus, very little change in load impedance is experienced. It is only necessary under such circumstances to compensate for changes in supply voltage. In such applications the apparatus as shown in Fig. 1 may be modified somewhat, as shown in Fig. 2, to decrease the cost thereof.

In Fig. 2, the current transformer 177 of Fig. 1 is omitted, and the input of the step-up transformer 181 is supplied by the voltage appearing across a capacitor 203 which is connected in series with a resistor 205 across the primary winding 3 of the welding transformer 5. By proper adjustment of the values of the resistor 205 and capacitor 203, the wave form of the voltage existing across the capacitor 203 has the same wave form as the current flowing in the primary winding 3 of the welding transformer. Moreover, the magnitude of the voltage across the capacitor 203 is proportional to the current through the primary winding 3. This may be easily understood, if it is remembered that a capacitor reacts to voltage changes across its terminals in the same manner that an inductance reacts to current changes. If $R_1$ is the resistance of the resistor 205, and $C_1$ is the capacitance of the capacitor 203, and $R_2$ and $L_2$ are the resistance and inductance, respectively of the impedance of the primary winding 3 of the welding transformer 5 then $$\frac{R_2}{\sqrt{R_2^2+(L_2W)^2}} = \frac{\frac{1}{C_1W}}{\sqrt{R_1^2+\left(\frac{1}{C_1W}\right)^2}} \text{ (approximately)}$$

Assuming there is no change in the power factor or impedance of the load of the welding transformer, the voltage across $C_1$ may then be used as an indication of the current flowing in the primary winding. This provides the measurement of the proportion of the voltage wave that is effective in producing current flow, and since this is the quantity that is being controlled, good voltage compensation may be obtained.

In experimental apparatus corresponding to the system of Fig. 1, I have found that change in welding current to be limited to a change of 2%, as a result of change in load impedance that would produce a current change of 40% without regulation. I have also found that for a 40% in line voltage, the current change is but 5%.

Although I have shown and described specific embodiments of my invention, I am aware that many modifications thereof may be made without departing from the spirit of the invention. Accordingly, I do not intend to limit my invention to the specific embodiments illustrated.

I claim as my invention:

1. A control system for use in supplying energy to a load from an alternating potential source, comprising electric valve means of the arc-like type adapted to be connected in circuit with said load to control the flow of current through the load from said source, means for rendering said valve means conductive in each half period of said alternating potential during a timed period including phase shifting means having an input circuit adapted to be energized from said source and an output circuit connected to said valve means, the instant in a half period at which said valve means is rendered conductive being determined by the amount of phase shift provided by said phase shifting means, manually adjustable means connected to said phase shifting means to preselect the amount of phase shift for a desired load current, means adapted to be responsive to the load current for developing a first voltage substantially proportional to the R. M. S. value thereof, means operable during said timed period for establishing a second standard voltage corresponding in magnitude to the first voltage which would be developed with the desired load current, and means connected to said phase shifting means for varying the amount of phase shift in accordance with the difference between said first and second voltages to maintain the R. M. S. value of the load current substantially constant.

2. A control system for use in supplying energy to a load from an alternating potential source, comprising electric valve means of the arc-like type adapted to be connected in circuit with said load to control the flow of current through the load from said source, means for rendering said valve means conductive in each half period of said alternating potential during a timed period including phase shifting means having an input circuit adapted to be energized from said source and an output circuit connected to said valve means, the instant in a half period at which said valve means is rendered conductive being determined by the amount of phase shift provided by said phase shifting means, control means connected to said phase shifting means for varying the amount of phase shift provided in accordance with the voltage impressed on said control means, means for impressing on said control means a first voltage capable of effecting a phase shift resulting in a desired load current, means adapted to be responsive to the load current for developing a second voltage substantially proportional to the R. M. S. value of the load current, means operable during said timed period for developing a third voltage of opposite polarity and corresponding in magnitude to the second voltage which would be developed with the desired load current flowing, and means for also impressing the voltage difference between said second and third voltages on said control means whereby to vary the amount of phase shift to maintain the R. M. S. value of the load current substantially constant.

3. Apparatus according to claim 2 in which the means for developing the second voltage comprises a current transformer having a primary winding adapted to be connected in circuit with said load and a secondary winding, a full-wave rectifier supplied from the secondary winding and a capacitor and resistor connected in parallel to receive the output of the rectifier, the dimensions of said capacitor and resistor being selected to effect a voltage drop across the resistor which is substantially proportional to the R. M. S. value of the load current, and in which the means for developing said third voltage comprises a second capacitor and a second resistor connected in parallel and means for impressing a fourth direct current voltage thereon during said timed period, said second capacitor and resistor being of such dimensions that the voltage drop across the second resistor increases at the beginning of said timed period at substantially the same rate as the voltage across said first resistor.

4. A control system for use in supplying energy to a load from an alternating potential source, comprising electric valve means of the arc-like type adapted to be connected in circuit with said load to control the flow of current through the load from said source, means for rendering said valve means conductive in each half period of said alternating potential during a timed period including phase shifting means having an input circuit adapted to be energized from said source and an output circuit connected to said valve means, and including a vacuum tube the conductivity of which determines the amount of phase shift provided by the phase shifting means, with the instant in a half period at which said valve means is rendered conductive being determined by the amount of phase shift, control means for controlling the conductivity of said vacuum tube in accordance with the voltage impressed on said control means, means for impressing on said control means a first voltage capable of effecting a phase shift resulting in a desired load current, means adapted to be responsive to the load current for developing a second voltage substantially proportional to the R. M. S. value of the load current, means operable during said timed period for developing a third voltage of opposite polarity and corresponding in magnitude to the second voltage which would be developed with the desired load current flowing, and means for also impressing the voltage difference between said second and third voltages on said control means whereby to vary the amount of phase shift to maintain the R. M. S. value of the load current substantially constant.

EDWARD C. HARTWIG.

REFERENCES CITED

The following references are of record in the file of this patent:

UNITED STATES PATENTS

| Number | Name | Date |
| --- | --- | --- |
| 2,355,453 | Livingston | Aug. 8, 1944 |